(12) United States Patent
Harris et al.

(10) Patent No.: US 6,214,773 B1
(45) Date of Patent: Apr. 10, 2001

(54) HIGH TEMPERATURE, LOW RESIDUE WELL TREATING FLUIDS AND METHODS

(75) Inventors: Phillip C. Harris; Stanley J. Heath; David M. Barrick; Ron J. Powell, all of Duncan; Billy F. Slabaugh, Marlow; Shane L. Milson, Duncan; Gregory L. Tanaka, Duncan; Harold G. Walters, Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/408,059

(22) Filed: Sep. 29, 1999

(51) Int. Cl.$^7$ .............................. C09K 3/00; E21B 43/26
(52) U.S. Cl. ......................... 507/271; 507/209; 507/211; 507/273; 507/903; 507/921; 507/922; 166/308
(58) Field of Search ................... 507/209, 211, 507/271, 273, 921, 922, 903; 166/308

(56) References Cited

U.S. PATENT DOCUMENTS

| | | | |
|---|---|---|---|
| 4,462,917 | 7/1984 | Conway | 252/8.55 R |
| 4,514,309 | 4/1985 | Wadhwa et al. | 252/8.55 R |
| 4,683,068 * | 7/1987 | Kucera | 507/271 |
| 4,741,401 * | 5/1988 | Walles et al. | 507/209 |
| 5,165,479 | 11/1992 | Harris et al. | 166/300 |
| 5,413,178 | 5/1995 | Walker et al. | 166/300 |
| 5,669,446 | 9/1997 | Walker et al. | 166/300 |
| 5,669,447 * | 9/1997 | Walker et al. | 507/921 |
| 5,827,804 | 10/1998 | Harris et al. | 507/273 |
| 5,950,731 | 9/1999 | Shuchart et al. | 166/300 |

* cited by examiner

*Primary Examiner*—Philip Tucker
(74) *Attorney, Agent, or Firm*—Robert A. Kent; C. Clark Dougherty, Jr.

(57) ABSTRACT

Improved high temperature, low residue viscous well treating fluids and methods of using the fluids are provided by the present invention. The improved viscous well treating fluids are basically comprised of water; a hydrated galactomannan gelling agent; a retarded cross-linking composition for buffering the treating fluid and cross-linking the hydrated galactomannan gelling agent comprised of a liquid solvent, an organotitanate chelate and a borate ion producing compound; and a delayed gel breaker.

26 Claims, No Drawings

HIGH TEMPERATURE, LOW RESIDUE WELL TREATING FLUIDS AND METHODS

BACKGROUND OF THE INVENTION

1. Field of the Invention

The present invention relates to improved high temperature, low residue viscous ell treating fluids and methods of using the fluids for treating subterranean zones.

2. Description of the Prior Art

High viscosity aqueous cross-linked gels are used in a variety of operations and treatments carried out in oil and gas wells. Such operations and treatments include, but are not limited to, production stimulation treatments, well completion operations, fluid loss control treatments and treatments to reduce water production.

An example of a production stimulation treatment utilizing a high viscosity cross-linked gelled fluid is hydraulic fracturing. In hydraulic fracturing treatments, the high viscosity fluid is utilized as a fracturing fluid and a carrier fluid for particulate propping agent, e.g., sand. That is, the high viscosity fluid is pumped through the well bore into a subterranean zone to be fractured at a rate and pressure such that fractures are formed and extended in the zone. Propping agent is suspended in the fracturing fluid so that the propping agent is deposited in the fractures. The fracturing fluid is then broken into a thin fluid and returned to the surface. The propping agent functions to prevent the fractures from closing whereby conductive channels are formed through which produced fluids can flow to the well bore.

A variety of cross-linking compounds and compositions have heretofore been utilized for cross-linking gelled aqueous well treating fluids. Various sources of borate have been utilized including boric acid, borax, sodium tetraborate, slightly water soluble borates such as ulexite, and other proprietary borate compositions such as polymeric borate compounds. Various compounds that are capable of releasing multivalent metal cations when dissolved in aqueous well treating fluids have also been used heretofore for cross-linking gelled aqueous well treating fluids. Examples of the multivalent metal ions are chromium, zirconium, antimony, titanium, iron, zinc and aluminum.

Delayed cross-linking compositions have also been utilized heretofore such as compositions containing borate ion producing compounds, chelated multivalent metal cations or mixtures of organotitanate compounds and polyhydroxyl containing compounds such as glycerol. However, high viscosity aqueous gels cross-linked with the above described cross-linking agents and compositions have encountered operational problems. That is, the high viscosity cross-linked gelled aqueous well treating fluids have often been difficult to break after being placed in a subterranean zone and upon breaking, leave residue in the subterranean zone, both of which interfere with the flow of produced fluids from the treated zone. Further, at high subterranean zone temperatures in the range of from about 125° F. to about 350° F., a relatively large quantity of gelling agent is required in the cross-linked gelled aqueous well treating fluid to achieve adequate viscosity which produces a greater amount of residue in the treated zone and the high viscosity produced rapidly declines with time.

Thus, there are needs for improved high temperature well treating fluids and methods of using such fluids wherein the fluids require less gelling agent thereby reducing the residue left in subterranean zones treated therewith and the treating fluids have high viscosities which are stable over time at high temperatures.

SUMMARY OF THE INVENTION

The present invention provides high temperature, low residue well treating fluids and methods which meet the needs described above and overcome the deficiencies of the prior art. The improved viscous well treating fluids of the present invention are basically comprised of water; a hydrated galactomannan gelling agent present in the treating fluid in an amount in the range of from about 0.12% to about 0.48% by weight of the water in the treating fluid; a retarded cross-linking composition for buffering the treating fluid and cross-linking the hydrated galactomannan gelling agent comprised of a liquid solvent, an organotitanate chelate, and a borate ion producing compound, the retarded cross-linking composition being present in the treating fluid in an amount in the range of from about 0.04% to about 1.0% by weight of water in the treating fluid; and a delayed gel breaker for causing the viscous treating fluid to break into a thin fluid present in the treating fluid in an amount in the range of from about 0.01% to about 2.5% by weight of water in the treating fluid.

The improved methods of this invention for treating a subterranean zone penetrated by a well bore are basically comprised of the following steps. A viscous low residue well treating fluid is prepared comprised of water; a hydratable galactomannan gelling agent; a retarded cross-linking composition comprised of a liquid solvent, an organotitanate chelate, a borate ion producing compound; and a delayed gel breaker. The prepared well treating fluid is then pumped into the subterranean zone at a rate and pressure sufficient to treat the zone by way of the well bore during which the hydrated gelling agent in the treating fluid is cross-linked by the retarded cross-linking composition. Thereafter, the viscous treating fluid is allowed to break into a thin fluid.

In fracture stimulation treatments using the viscous low residue well treating fluid, the treating fluid is pumped into the subterranean zone at a rate and pressure such that one or more fractures are formed in the zone and particulate solid propping agent carried by the treating fluid is deposited in the fractures.

It is, therefore, a general object of the present invention to provide improved high temperature, low residue viscous well treating fluids and methods of using such fluids.

Other and further objects, features and advantages of the present invention will be readily apparent to those skilled in the art upon a reading of the description of preferred embodiments which follows.

DESCRIPTION OF PREFERRED EMBODIMENTS

As mentioned above, the improved high temperature, low residue well treating fluids of this invention utilize low gelling agent concentrations in high temperature applications, i.e., 5 to 10 pounds of gelling agent per 1,000 gallons of water less than has been typically utilized in high temperature applications heretofore. The treating fluids have stable high viscosities and are broken in a controlled manner by the delayed gel breaker included in the treating fluids. Because the treating fluids have less gelling agent and are clear, clean aqueous gels, less residue is left in subterranean zones treated therewith.

The improved treating fluids of this invention are suitable for performing a variety of operations in subterranean zones having high temperatures, i.e., temperatures in the range of from about 125° F. to about 350° F. The treating fluids are particularly suitable for carrying out fracture stimulation procedures in subterranean zones having temperatures in the range of from about 200° F. to about 275° F.

An improved high temperature, low residue treating fluid of this invention is basically comprised of water; a hydrated galactomannan gelling agent present in the treating fluid in an amount in the range of from about 0.12% to about 0.48% by weight of the water in the treating fluid; a retarded cross-linking composition for buffering the treating fluid and cross-linking the hydrated galactomannan gelling agent comprised of a liquid solvent, an organotitanate chelate, and a borate ion producing compound, the retarded cross-linking composition being present in the treating fluid in an amount in the range of from about 0.04% to about 1.0% by weight of water in the treating fluid; and a delayed gel breaker for causing the viscous treating fluid to break into a thin fluid present in the treating fluid in an amount in the range of from about 0.01% to about 2.5% by weight of water in the treating fluid.

The water utilized to form the improved treating fluids of this invention can be fresh water, salt water, brine or any other aqueous liquid which does not adversely react with other components of the treating fluid. The water used in well treating fluids normally contains one or more salts for inhibiting the swelling of clays in the subterranean zones being treated. The most common clay inhibiting salt utilized is potassium chloride, but other salts and clay treating agents such as tetramethyl ammonium chloride can also be used. The pH of the water is preferably in the range of from about 6 to about 8.5 to facilitate the hydration of the galactomannan gelling agent utilized.

The galactomannan gelling agents which can be used in accordance with the present invention are the naturally occurring gums and their derivatives such as guar, locust bean, tara, honey locust, tamarind, karaya, tragacanth, carrageenan and the like. These gums are generally characterized as containing a linear backbone consisting of mannose units having various amounts of galactose units attached thereto. The gums can also be characterized as having one or more functional groups such as cis-hydroxyl, hydroxyl, carboxyl, sulfate, sulfonate, amino or amide. Of the various galactomannan gelling agents which can be utilized, one or more gelling agents selected from the group of guar and guar derivatives. Examples of guar derivatives which can be used, include hydroxyethylguar, hydroxypropylguar, carboxymethylguar, carboxymethylhydroxyethylguar and carboxymethylhydroxypropylguar. Of these, carboxymethylhydroxypropylguar is preferred.

When one or more of the above mentioned galactomannan gelling agents are dissolved in water, the gelling agents are hydrated and a viscous aqueous gel is formed. In accordance with this invention, the galactomannan gelling agent or agents utilized are dissolved in the water in an amount in the range of from about 0.12% to about 0.48% by weight of the water, more preferably in an amount in the range of from about 0.18% to about 0.36% and most preferably in an amount of from about 0.24% to about 0.30%.

The retarded cross-linking composition for buffering the treating fluid and cross-linking the hydrated galactomannan gelling agent therein is a liquid solution comprised of a liquid solvent, an organotitanate chelate, and a borate ion producing compound. The liquid solvent is preferably comprised of fresh water present in an amount from about 5% to about 15% by weight of the liquid solvent, triethanolamine present in an amount from about 5% to about 35% by weight of the liquid solvent, a polyhydroxyl containing compound present in an amount from about 40% to about 65% by weight of the liquid solvent, and isopropyl alcohol present in an amount from about 10% to about 20% by weight of the liquid solvent, but other suitable aqueous solvent mixtures can be used. The liquid solvent is generally present in the retarded cross-linking composition in an amount in the range of from about 60% to about 80% by weight of the composition, more preferably in an amount in the range of from about 65% to about 75% and most preferably in an amount of from about 70% to about 72%.

The organotitanate chelate utilized in the retarded cross-linking composition is preferably selected from the group of titanium triethanolamine chelate, titanium ammonium lactate chelate and titanium acetylacetonate chelate. Of these, titanium triethanolamine chelate is most preferred. A particularly suitable titanium triethanolamine chelate is commercially available under the trademark "Tyzor® TE" from the DuPont Co., Wilmington, Del. The organotitanate chelate utilized is generally included in the retarded cross-linking composition in an amount in the range of from about 15% to about 35% by weight of the composition, more preferably in an amount in the range of from about 24% to about 28% and most preferably in an amount of from about 25% to about 26%.

The borate ion producing compound included in the retarded cross-linking composition can be selected from the group of boric acid, alkali metal borates, alkaline earth metal borates, polymeric borate compounds and the like. An example of a suitable polymeric borate compound is a polymeric compound of boric acid and an alkali borate which is commercially available under the trademark "POLYBOR®" from U.S. Borax of Valencia, Calif. The borate ion producing compound used is generally included in the retarded cross-linking composition in an amount in the range of from about 1% to about 15% by weight of the composition, more preferably in an amount in the range of from about 1% to about 5% and most preferably in an amount of from about 2% to about 4%. The molar ratio of titanium to borate in the retarded cross-linking composition is preferably in the range of from 1 to 0.1, to about 1 to 2.

Examples of the polyhydroxyl containing compounds which can be utilized in the liquid solvent of the retarded cross-linking composition include glycerol, erythritol, threitol, ribitol, arabinitol, xylitol, allitol, altritol, sorbitol, mannitol, dulcitol, iditol and perseitol. Of these, glycerol is preferred. The polyhydroxyl containing compound functions in the retarded cross-linking composition to delay the rate of the cross-linking reaction for a period of time sufficient to permit the aqueous gel to be pumped to the subterranean zone to be treated. The time can be delayed from several minutes to one or more hours in extremely deep subterranean formations. The particular amount of the polyhydroxyl containing compound utilized to delay the cross-linking reaction will depend upon the time delay required. Generally, however, the polyhydroxyl containing compound is included in the retarded cross-linking composition of this invention in a general amount in the range of from about 30% to about 50%, by weight of the composition more often in an amount in the range of from about 35% to about 45%.

As mentioned above, the retarded cross-linking composition of this invention allows lower concentrations of the galactomannan gelling agent to be used at the high temperatures involved. As a result, the high viscosity treating fluids of this invention leave less residue in treated zones after breaking into thin fluids and being removed from the treated zones. This in turn results in high regained treated zone conductivities. The retarded cross-linking composition is generally included in the well treating fluids of this invention in an amount in the range of from about 0.04% to about 1.0% by weight of water in the treating fluids, preferably in an amount in the range of from about 0.06% to about 0.75% and most preferably in an amount of from about 0.10% to about 0.20%.

The retarded cross-linking composition described above is preferably prepared as follows. The water, preferably deionized fresh water, the polyhydroxyl containing compound used, the borate ion producing compound used and the triethanolamine are combined, mixed and heated to dissolve the borate ion producing compound. The resulting solution is then combined with isopropyl alcohol and the organotitanate chelate used is added to the solution and mixed therewith until dissolved. The resulting solution is heated to above 130° F. and held at that temperature for sufficient time to stabilize the solution, e.g., 2 to 8 hours, and to increase the effectiveness of the cross-linking composition in producing a treating fluid having high viscosity at the high temperatures mentioned above. After heating, the composition is cooled to room temperature.

While various delayed cross-linked gel breakers can be utilized in the treating fluids of this invention, it is essential that the breakers used provide a controlled complete break of the viscous treating fluid in a relatively short time, i.e., a time in the range of from about 30 minutes to about 24 hours at temperatures in the range of from about 200° F. to about 275° F. and higher. A breaker which is preferred and which functions as described above to provide excellent subterranean zone regained conductivities is a mixture of calcium hypochlorite or an alkali metal chlorite or hypochlorite, and optionally, an activator such as a copper ion producing compound, e.g., copper EDTA. Such breakers and activators are described in U.S. Pat. No. 5,413,178 issued on May 9, 1995; U.S. Pat. No. 5,669,446 issued on Sep. 23, 1997; and U.S. Pat. No. 5,950,731 issued on Sep. 14, 1999; the entire disclosures of which are incorporated herein by reference. The delayed cross-linked gel breaker is included in the treating fluids of this invention in an amount in the range of from about 0.01% to about 2.5% by weight of water in the treating fluids. As will be understood, the particular amount of the breaker included in a treating fluid depends on the time required for the controlled break of the treating fluid to take place. The amount utilized is most often in the range of from about 0.025% to about 1.2% by weight of water in the treating fluid.

As will be understood by those skilled in the art, a variety of conventional additives can be included in the well treating fluids of this invention such as gel stabilizers, bactericides and the like which do not adversely react with the treating fluid or prevent their use in a desired manner.

A particularly preferred high temperature, low residue viscous well treating fluid of this invention is comprised of water; hydrated carboxymethylhydroxypropylguar present in an amount of from about 0.24% to about 0.30% by weight of water in the treating fluid; a retarded cross-linking composition comprised of a liquid solvent present in an amount in the range of from about 70% to about 72% by weight of the composition, a titanium triethanolamine chelate present in an amount in the range of from about 25% to about 26% by weight of the composition and a borate ion producing compound present in an amount in the range of from about 2% to about 4% of the composition, the retarded cross-linking composition being present in the treating fluid in an amount in the range of from about 0.10% to about 0.20% by weight of water in the treating fluid; and a delayed gel breaker comprised of a mixture of sodium chlorite and optionally a copper ion producing compound present in the treating fluid in an amount in the range of from about 0.025% to about 1.2% by weight of water therein.

Zirconium compounds, such as zirconium triethanolamine chelate, zirconium ammonium lactate chelate and zirconium acetylacetonate, may be substituted in the present invention for the titanium chelates described above, but zirconium is less efficient than titanium.

The improved methods of the present invention for treating a subterranean zone penetrated by a well bore are comprised of the following steps. A viscous low residue well treating fluid of the present invention as described above is prepared comprised of water; a hydrated galactomannan gelling agent; a retarded cross-linking composition comprised of a liquid solvent, an organotitanate chelate and a borate ion producing compound; and a delayed gel breaker. Thereafter, the prepared well treating fluid is pumped into the subterranean zone by way of the well bore at a rate and pressure sufficient to treat the zone during which the hydrated gelling agent in the treating fluid is cross-linked by the retarded cross-linked composition. After being placed in the subterranean zone, the viscous treating fluid is allowed to break into a thin fluid.

When the treatment performed in the subterranean zone is a fracture stimulation treatment, the treating fluid is pumped at a rate and pressure such that one or more fractures are formed in the zone. In addition, a particulate solid propping agent is suspended in a portion of the treating fluid so that proppant is deposited in the fracture or fractures. The fracture or fractures are propped open by the propping agent whereby produced fluid conducting channels are formed in the zone.

In order to further illustrate the compositions and methods of the present invention the following examples are given.

EXAMPLE 1

A base aqueous gel was prepared by adding sodium bicarbonate in an amount of 2.5 pounds per 1,000 gallons of water, sodium thiosulfate in an amount of 10 pounds per 1,000 gallons of water, a 50% active solution of tetramethyl ammonium chloride in an amount of 2 gallons per 1,000 gallons of water and carboxymethylhydroxypropyl guar in an amount of 25 pounds per 1,000 gallons of water to water in a 1 liter blender jar and mixed for about 30 minutes. A 250 milliliter aliquot of the base gel was removed and placed into a 500 milliliter blender jar. A retarded cross-linking composition of the present invention was added to the blender jar along with a delayed gel breaker solution and mixed with the base aqueous gel for 30 seconds. Thereafter, a 65 milliliter aliquot was removed and placed into a Fann Model 50 viscometer cup. The sample cup was placed on the viscometer and the system was pressured to 300 psi with the sample bath heater at test temperature. Viscosity data was collected every second and time averaged. An R1 cup and B2 bob configuration was used. A multi-scan protocol was used with a base rpm of 105; scan protocol: 400, 200, 100, 50, 25, 10; scan every 10 minutes.

The retarded cross-linking composition was comprised of a liquid solvent, a titanium triethanolamine chelate and a borate ion producing compound, i.e., boric acid, in the amounts set forth above. The liquid solvent was comprised of fresh water, triethanolamine, isopropyl alcohol and glycerol in the amounts given above. The delayed gel breaker utilized was sodium chlorite. The results of these tests are given in Table I below along with the amounts of delayed gel breaker utilized.

TABLE I

Viscosities Of The Treating Fluid Of The Present Invention At 275° F.

| | Viscosities at 40 sec$^{-1}$, centipoises | | | |
|---|---|---|---|---|
| Elapsed Time, min. | 0 lb/1000 gal. Gel Breaker | 2.5 lb/1000 gal. Gel Breaker | 4 lb/1000 gal. Gel Breaker | 5 lb/1000 gal. Gel Breaker |
| 0 | 1092 | 875 | 692 | 392 |
| 30 | 972 | 735 | 536 | 149 |
| 60 | 852 | 595 | 380 | 75 |
| 90 | 732 | 455 | 224 | 1 |
| 120 | 613 | 315 | 67 | — |

The test procedure described above was repeated, but instead of the retarded cross-linkng composition of this invention, a borate cross-linker only was utilized in a first test and a titanium triethanolamine chelate cross-linker only was utilized in a second test. The results of these tests are set forth in Table II below.

TABLE II

Fluid Viscosities At 250° F. Using Borate Only And Titanium Chelate Only Cross-Linkers

| | Viscosities at 40 sec$^{-1}$, centipoises | |
|---|---|---|
| Elapsed Time, min. | Borate Only | Titanium Triethanolamine Chelate |
| 0 | <25 | 804 |
| 30 | — | 692 |
| 60 | — | 533 |
| 90 | — | 410 |
| 120 | — | 239 |

A comparison of the viscosities over time of the well treating fluid of the present invention (Table I) with the treating fluids including only borate or only titanium triethanolamine chelate cross-linkers (Table II) clearly show that the treating fluid of the present invention retains much higher viscosities.

EXAMPLE 2

A base aqueous gel was prepared by adding an ammonium acetate solution in an amount of 0.1 gallons per 1,000 gallons of water, a 25% caustic solution in an amount of 0.2 gallons per 1,000 gallons of water, sodium thiosulfate in an amount of 10 pounds per 1,000 gallons of water, potassium chloride in an amount of 2% by weight of the water used and carboxymethylhydroxypropyl guar in an amount of 25 pounds per 1,000 gallons of water to water in a 1 liter blender jar and the resulting fluid was mixed in the blender jar for 30 minutes. The procedure set forth in Example 1 was then repeated using a retarded cross-linking composition having the same components and quantities as the titanium-borate ion producing compound cross-linking composition utilized in Example 1 except that zirconium triethanolamine chelate only was substituted for the titanium triethanolamine chelate-borate ion producing compound in the retarded cross-linking composition in a first test and zirconium triethanolamine chelate was substituted for the titanium triethanolamine chelate in the retarded cross-linking composition in a second test. The results of these tests are set forth in Table III below.

TABLE III

Treating Fluid Viscosities At 250° F. Using Zirconium Chelate Only And Zirconium Chelate-Borate As Cross-Linkers

| | Viscosities at 40 sec$^{-1}$, centipoises | |
|---|---|---|
| Elapsed Time, min. | Zirconium Chelate[1] | Zirconium Chelate-Borate |
| 30 | 586 | 1153 |
| 60 | 566 | 1025 |
| 90 | 514 | 1076 |
| 120 | 473 | 929 |

[1]Treating fluid did not contain caustic solution.

From Table III it can be seen that the treating fluid containing a zirconium-borate retarded cross-linking composition also produced and retained high viscosities.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved high temperature, low residue viscous well treating fluid comprising:

water;

a hydrated galactomannan gelling agent present in said treating fluid in an amount in the range of from about 0.12% to about 0.48% by weight of said water in said treating fluid;

a retarded cross-linking composition for buffering said treating fluid and cross-linking said hydrated galactomannan gelling agent comprised of a liquid solvent comprising a mixture of water, triethanolamine, a polyhydroxyl containing compound and isopropyl alcohol, an organotitanate chelate or an organozirconate chelate and a borate ion producing compound, said retarded cross-linking composition being present in said treating fluid in an amount in the range of from about 0.04% to about 1.0% by weight of water in said treating fluid; and a delayed gel breaker for causing said viscous treating fluid to break into a thin fluid present in said treating fluid in an amount in the range of from about 0.01% to about 2.5% by weight of water in said treating fluid.

2. The treating fluid of claim 1 wherein said galactomannan gelling agent is selected from the group consisting of guar and guar derivatives.

3. The treating fluid of claim 1 wherein said galactomannan gelling agent is carboxymethylhydroxypropylguar.

4. The treating fluid of claim 1 wherein said polyhydroxyl containing compound in said liquid solvent is selected from the group consisting of glycerol, erythritol, threitol, ribitol, arabinitol, xylitol, allitol, altritol, sorbitol, mannitol, dulcitol, iditol and perseitol.

5. The treating fluid of claim 1 wherein said polyhydroxyl containing compound is glycerol.

6. The treating fluid of claim 1 wherein said liquid solvent is present in said composition in an amount in the range of from about 60% to about 80% by weight of said composition.

7. The treating fluid of claim 1 wherein said organotitanate chelate in said retarded cross-linking composition is selected from the group consisting of titanium triethanolamine chelate, titanium ammonium lactate chelate, titanium acetylacetonate chelate, and said organozirconate chelate is selected from the group consisting of zirconium triethanolamine chelate, zirconium ammonium lactate chelate and zirconium acetylacetonate chelate.

8. The treating fluid of claim 7 wherein said organotitanate chelate is present in said composition in an amount in the range of from about 15% to about 35% by weight of said composition.

9. The treating fluid of claim 1 wherein said borate ion producing compound in said retarded cross-linking composition is selected from the group consisting of boric acid, alkali metal borates, alkaline earth metal borates and polymeric borate compounds.

10. The treating fluid of claim 9 wherein said borate ion producing compound is present in said composition in an amount in the range of from about 1% to about 15% by weight of said composition.

11. The treating fluid of claim 1 wherein said delayed gel breaker is a mixture of sodium chlorite and a copper ion producing compound and is present in said treating fluid in an amount in the range of from about 0.01% to about 2.5% by weight of water in said treating fluid.

12. An improved high temperature, low residue viscous well treating fluid comprising:

water;

hydrated carboxymethylhydroxypropylguar present in said treating fluid in an amount of about 0.24% to about 0.30% by weight of water in said treating fluid;

a retarded cross-linking composition for buffering said treating fluid and cross-linking said hydrated carboxymethylhydroxypropylguar comprised of an aqueous liquid solvent comprising a mixture of water, triethanolamine, a polyhydroxyl compound and isopropyl alcohol, a titanium triethanolamine chelate and a borate ion containing compound, said retarded cross-linking composition being present in said treating fluid in an amount in the range of from about 0.1% to about 0.2% by weight of water in said treating fluid; and a delayed gel breaker for causing said viscous treating fluid to revert to a thin fluid comprised of a mixture of sodium chlorite and a copper ion producing compound present in said treating fluid in an amount in the range of from about 0.025% to about 1.2% by weight of water in said treating fluid.

13. The treating fluid of claim 12 wherein said liquid solvent in said retarded cross-linking composition is present in said composition in an amount in the range of from about 70% to about 72% by weight of said composition.

14. The treating fluid of claim 13 wherein said polyhydroxyl containing compound in said liquid solvent is glycerol.

15. The treating fluid of claim 12 wherein said titanium triethanolamine chelate in said retarded cross-linking composition is present therein in an amount in the range of from about 25% to about 26% by weight of said composition.

16. The treating fluid of claim 12 wherein said borate ion producing compound in said retarded cross-linking composition is present therein in an amount in the range of from about 2% to about 4% by weight of said composition.

17. An improved method of treating a subterranean zone penetrated by a well bore comprising the steps of:

(a) preparing a viscous, low residue well treating fluid comprised of water, a hydrated galactomannan gelling agent, a retarded cross-linking composition comprised of a liquid solvent comprising a mixture of water, triethanolamine, a polyhydroxyl compound and isopropyl alcohol, an organotitanate chelate, a borate ion producing compound, and a delayed gel breaker;

(b) pumping said well treating fluid into said zone by way of said well bore at a rate and pressure sufficient to treat said zone during which said hydrated gelling agent in said treating fluid is cross-linked by said retarded cross-linking composition; and (c) allowing said viscous treating fluid to break into a thin fluid.

18. The method of claim 17 wherein said pumping of said well treating fluid in accordance with step (b) is at a rate and pressure such that one or more fractures are formed in said zone.

19. The method of claim 18 wherein said well treating fluid includes particulate solid propping agent suspended therein.

20. The method of claim 17 wherein said hydrated galactomannan gelling agent is carboxymethylhydroxypropylguar and is present in said treating fluid in an amount in the range of from about 0.12% to about 0.48% by weight of water therein.

21. The method of claim 17 wherein said retarded cross-linking composition is present in said treating fluid in an amount in the range of from about 0.4% to about 1% by weight of water therein.

22. The method of claim 17 wherein said liquid solvent is present in said composition in an amount in the range of from about 60% to about 80% by weight thereof.

23. The method of claim 22 wherein said polyhydroxyl containing compound in liquid solvent is glycerol.

24. The method of claim 17 wherein said organotitanate chelate in said retarded cross-linking composition is titanium triethanolamine chelate and is present in said composition in an amount in the range of from about 15% to about 35% by weight thereof.

25. The method of claim 17 wherein said borate ion producing compound in said retarded cross-linking composition is boric acid and is present in said composition in an amount in the range of from about 1% to about 15% by weight thereof.

26. The method of claim 17 wherein said delayed gel breaker is a mixture of sodium chlorite and a copper ion producing compound and is present in said treating fluid in an amount in the range of from about 0.01% to about 2.5% by weight of water in said treating fluid.

* * * * *